United States Patent
Yap et al.

(10) Patent No.: US 10,198,837 B2
(45) Date of Patent: Feb. 5, 2019

(54) NETWORK GRAPHING SELECTOR

(71) Applicant: Microsoft Technology Licensing, LLC, Redmond, WA (US)

(72) Inventors: Moses Yap, Redmond, WA (US); Keith Robert Kinnan, Sammamish, WA (US); Sean Richard Smith, Snoqualmie, WA (US); Derrick Yeqiang Quan, Bellevue, WA (US); Jason Thomas McNamee, Redmond, WA (US); Saliha Azzam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/683,407

(22) Filed: Aug. 22, 2017

(65) Prior Publication Data
US 2018/0322667 A1    Nov. 8, 2018

Related U.S. Application Data

(60) Provisional application No. 62/503,263, filed on May 8, 2017.

(51) Int. Cl.
*G06T 11/20* (2006.01)
*H04L 12/24* (2006.01)
(Continued)

(52) U.S. Cl.
CPC .......... *G06T 11/206* (2013.01); *H04L 41/145* (2013.01); *G06F 3/0485* (2013.01);
(Continued)

(58) Field of Classification Search
None
See application file for complete search history.

(56) References Cited

U.S. PATENT DOCUMENTS 6,975,322 B2    12/2005   Lavelle
9,609,042 B1 *   3/2017   Pallemulle .............. H04L 67/02
(Continued)

OTHER PUBLICATIONS

Carrozzino, et al., "Urban Procedural Modeling for Real-Time Rendering", in Proceedings of the 3rd ISPRS International Workshop 3D-ARCH, 2009, 8 pages.
(Continued)

*Primary Examiner* — Jeffrey Chow
(74) *Attorney, Agent, or Firm* — Alleman Hall Creasman & Tuttle LLP

(57) ABSTRACT

A method of displaying a network graph with a computing system includes accessing data defining a network and including a plurality of vertices and a plurality of edges. If a number of vertices included in the network graph is below a first threshold, the network graph is locally rendering with a scalable vector graphics rendering engine of the computing system. If a number of vertices included in the network graph is between the first threshold and a second, higher, threshold, the network graph is locally rendered with a raster rendering engine of the computing system. If a number of vertices included in the network graph is above the second threshold, a remotely-rendered network graph rendered by a remote rendering engine is received at the computing system. The method further includes displaying the rendered network graph via a web browser of the computing system.

20 Claims, 6 Drawing Sheets

(51) Int. Cl.
　　　　*H04L 29/08*　　　(2006.01)
　　　　*G06F 3/0485*　　(2013.01)
　　　　*G06F 3/147*　　　(2006.01)
　　　　*G06F 3/0484*　　(2013.01)

(52) U.S. Cl.
　　　CPC .......... *G06F 3/04845* (2013.01); *G06F 3/147* (2013.01); *G06F 2203/04806* (2013.01); *G06T 2200/16* (2013.01); *G06T 2200/24* (2013.01); *H04L 67/02* (2013.01)

(56) References Cited

U.S. PATENT DOCUMENTS

| | | | | |
|---|---|---|---|---|
| 2005/0012749 | A1* | 1/2005 | Gonzalez | G06F 3/14 345/522 |
| 2013/0097520 | A1 | 4/2013 | Lewin et al. | |
| 2014/0162680 | A1* | 6/2014 | Kotecha | H04W 28/08 455/453 |
| 2014/0300643 | A1* | 10/2014 | Urosev | G06T 11/006 345/660 |
| 2015/0062140 | A1 | 3/2015 | Levantovsky et al. | |
| 2015/0278372 | A1* | 10/2015 | Balooshi | G06F 17/30867 707/706 |
| 2015/0379672 | A1 | 12/2015 | Wang | |

OTHER PUBLICATIONS

"Network Visualization and Modeling", https://www.grotto-networking.com/NetworkGraphVisualization.html, Retrieved on: May 15, 2017, 10 pages.

Qiao, et al., "Coastline optimization and real-time rendering based on raster data sets", in Proceedings of 6th IEEE Conference on Industrial Electronics and Applications, Jun. 21, 2011, pp. 2585-2588.

Shi, et al., "HiMap: Adaptive Visualization of Large-Scale Online Social Networks", in Proceedings of IEEE Pacific Visualization Symposium, Apr. 20, 2009, pp. 41-48.

\* cited by examiner

NETWORK GRAPHING SELECTOR

CROSS REFERENCE TO RELATED APPLICATIONS

This application claims priority to U.S. Provisional Patent Application No. 62/503,263, filed May 8, 2017, the entirety of which is hereby incorporated herein by reference.

BACKGROUND

People, places, and things can be interconnected in a network by a myriad of different relationships, dependencies, associations, and/or other connections. The individual people, places, and things in a network may be referred to as vertices. The relationships between the vertices may be referred to as edges. Sometimes, a visual representation of a network in which the vertices and edges are spatially arranged can help a human user extract information about the network. Visual representations of networks may be referred to as network graphs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of displaying a network graph with a computing system includes accessing data defining a network and including a plurality of vertices and a plurality of edges. If a number of vertices included in the network graph is below a first threshold, the network graph is locally rendering with a scalable vector graphics rendering engine of the computing system. If a number of vertices included in the network graph is between the first threshold and a second, higher, threshold, the network graph is locally rendered with a raster rendering engine of the computing system. If a number of vertices included in the network graph is above the second threshold, a remotely-rendered network graph rendered by a remote rendering engine is received at the computing system. The method further includes displaying the rendered network graph via a web browser of the computing system.

DETAILED DESCRIPTION

The current state of the art for drawing large network graphs for display via a web browser has many performance limitations. Approaches that are less computationally intensive than drawing spatially arranged network graphs are not as effective at showing sibling relationships or relationships between different object types. Moreover, such approaches may allow for less user interaction.

The present disclosure is directed to presenting browser-viewable network visualizations in a performant and intuitive manner regardless of network size. A network graph for virtually any type of network may be presented regardless of what the vertices (network entities) and edges (network relationships) represent. Similarly, a network graph may be created regardless of the data structure(s) used to represent the underlying network data.

Figure 1:
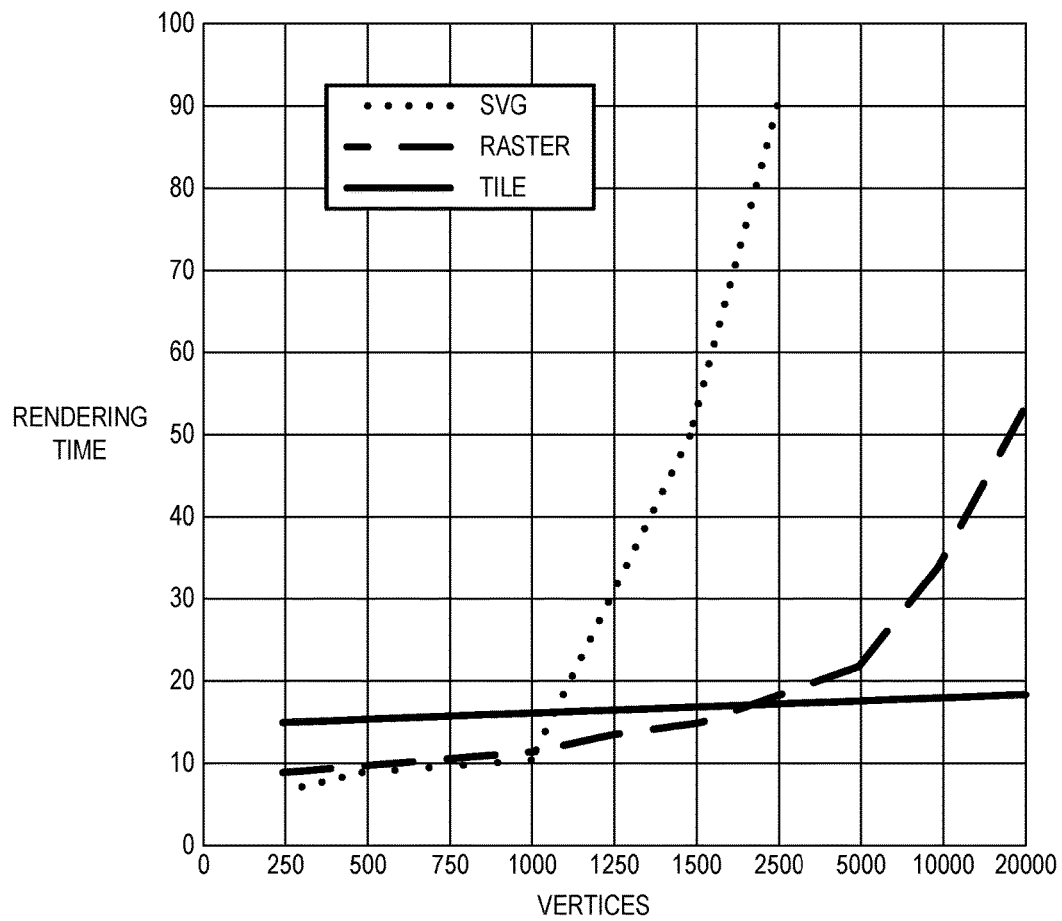
FIG. 1 is a plot showing rendering time versus network graph size.

As illustrated in FIG. 1, render times for a network graph can drastically increase as the size of the network graph increases. Some drawing technologies may increase render times to a greater extent than other drawing technologies. For example, the rendering time for a scalable vector graphics rendering engine to render a network graph may increase sharply once the network graph includes more than approximately one thousand vertices. In another example, the rendering time for a raster graphics rendering engine to render a network graph may increase sharply once the network graph includes more than approximately five thousand vertices. In still another example, the rendering time for tiles of a pre-rendered network graph to be rendered is similar regardless of the number of vertices included in the network graph.

In order to improve network graph functionality, intuitiveness, and performance, the visualization technique used to create a network graph may be switched based on one or more parameters of the underlying network data. An example parameter that can be used to trigger the switching between different visualization techniques is the size of the network (i.e., the number of vertices). For example, prior to rendering a network graph, a network graphing system may determine a total vertex count of the network, or portion thereof, to be rendered, and based on the vertex count, the network graphing system may dynamically render the network graph using a selected one of two or more different rendering engines. The rendering engine that is used for a particular set of underlying network data may be selected to provide a favorable mix of performance and interactivity for a particular vertex count.

As one example, a web browser-based network visualizer may switch between three different rendering engines depending on the number of vertices. The different visualization approaches may utilize any suitable algorithm for spatially arranging the vertices. In one particular example, if the number of vertices included in the network graph is below a first threshold, the network graph is locally rendered with a scalable vector graphics rendering engine of the computing system. If a number of vertices included in the network graph is between the first threshold and a second, higher, threshold, the network graph is locally rendered with a raster rendering engine of the computing system. If a number of vertices included in the network graph is above the second threshold, a remotely-rendered network graph rendered by a remote rendering engine is received at the computing system. By employing such an approach, a computing system that is configured to display visualizations of network graphs may avoid being slowed down due to rendering enormous network graphs, while still providing high interactivity when the network graphs are smaller in size.

Figure 2:
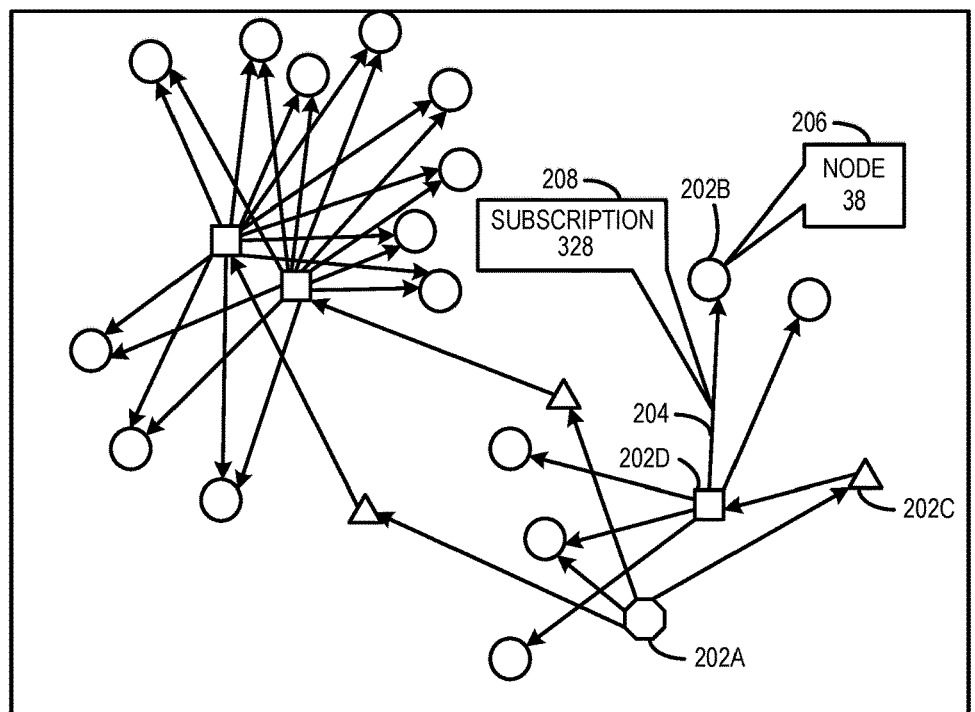
FIG. 2 shows a small network graph.
Figure 9:
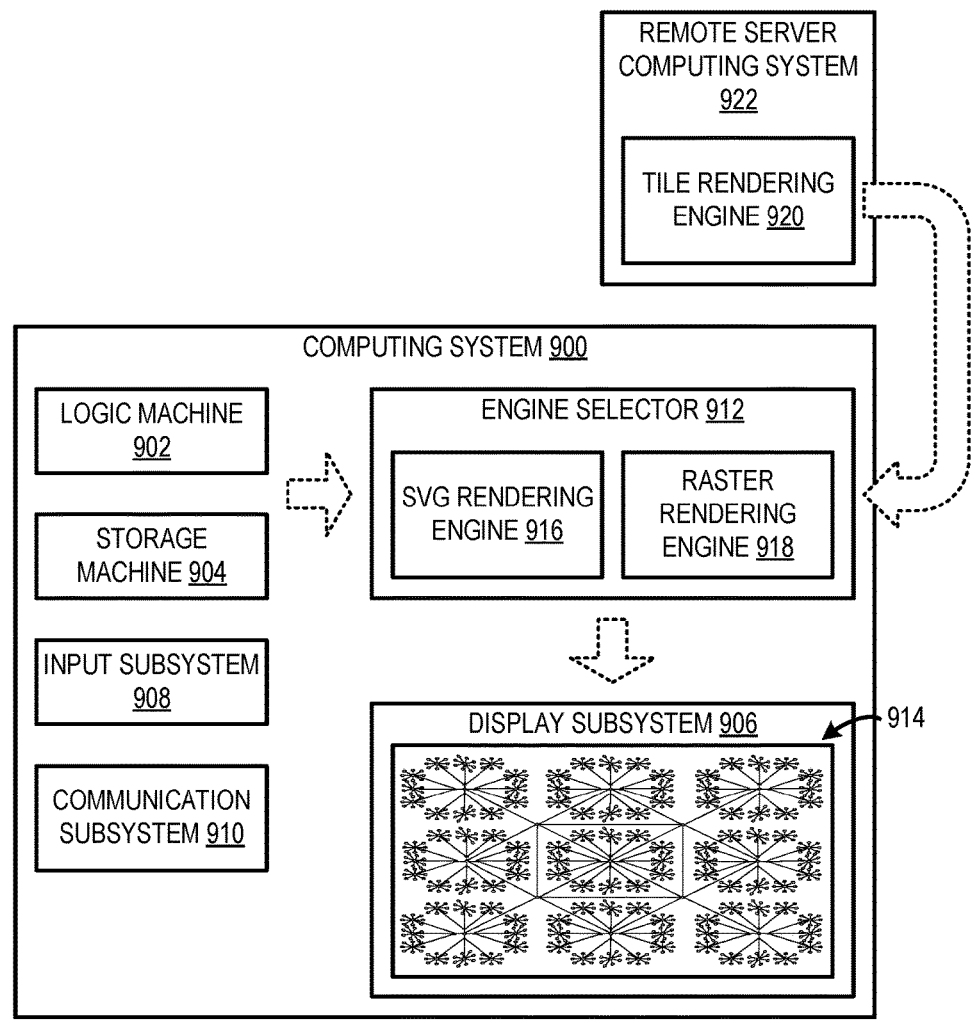
FIG. 9 shows an example computing system.

FIG. 2 shows an example small network graph 200 rendered by a scalable vector graphics (SVG) rendering engine of a computing system, such as SVG rendering engine 916 of computing system 900 of FIG. 9. The small network graph 200 includes a plurality of vertices 202 (e.g., 202A, 202B, 202C, 202D) connected to each other via a plurality of edges 204. The plurality of vertices 202 include different types of objects represented by different shapes in the illustrated example. A vertex of a network graph may represent any suitable object, person, place, entity, etc. The plurality of edges 204 represent relationships between different vertices 202 of the network graph 200. An edge may represent any suitable type of relationship between vertices. In some examples, different relationships may be represented by different types of edges, such as dotted lines, solid lines, etc.

For small graph sizes, an SVG-based rendering engine may be used to add vertices and edges into a hypertext markup language (HTML) document object model (DOM) that may be rendered for display via a web browser. In one example, a D3.js JavaScript library may be used for real time-rendering. Because SVG is vector based, each vertex 202 and edge 204 of the network graph 200 may be tracked separately. In other words, each vertex and edge may be represented by a different vector. Furthermore, each vertex 202 and edge 204 may be manipulated separately. SVG also allows different user events (e.g., click, mouse over, mouse out, keyboard, touch, hover, focus event) to be individually attached to different vertices and/or edges. As such, the computing system 900 may be configured to receive user input, associate the user input with one or more vectors of a rendered network graph, and perform a display operation related to the vertices or edges represented by the one or more vectors based on the user input.

In the illustrated example, user input (e.g., click, touch, hover) may be received that is associated with the vector representing the vertex 202B in the rendered network graph 200, and a description 206 of the vertex 202B is displayed based on the user input. In another example, user input may be received that is associated with the vector representing the edge 204 in the rendered network graph 200, and a description 208 is displayed based on the user input. Display of the network graph 200 may be manipulated (e.g., an updated network graph may be rendered) in any suitable manner based on any suitable user input. For example, user input may include a zoom operation that determines a number of vertices included in a network graph. In another example, user input may include a scroll operation that determines the number of vertices included in a network graph. In an example implementation, an SVG rendering engine is used to render network graphs that include up to 1,000 vertices for display via a web browser. In other examples, an SVG rendering engine may be used to render network graphs that include a different threshold number of vertices.

Figure 3:
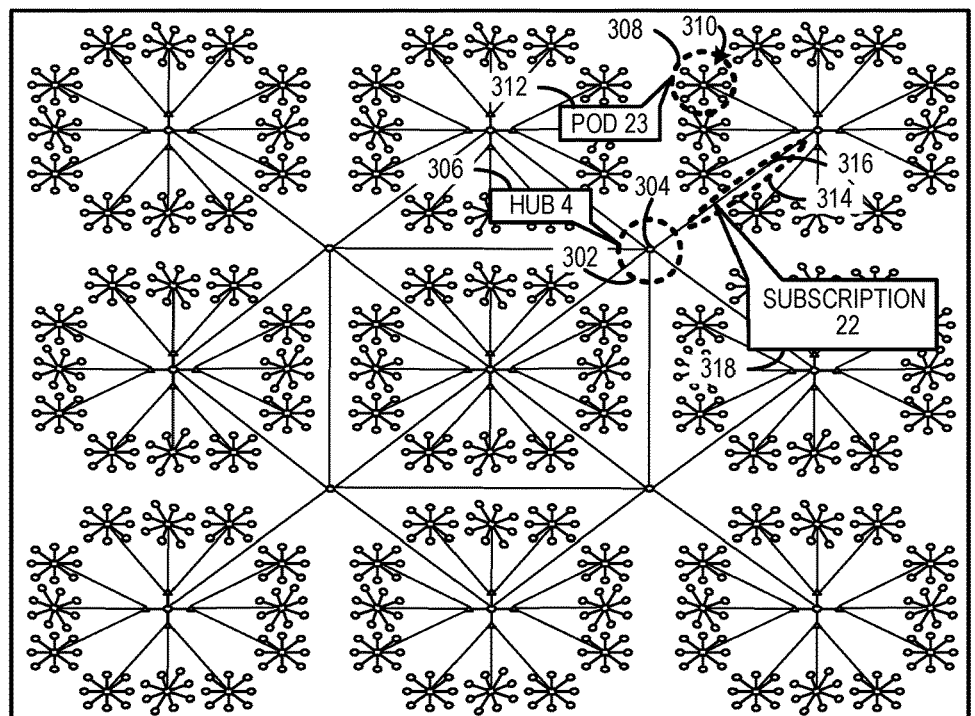
FIG. 3 shows a medium network graph.

FIG. 3 shows an example medium network graph 300 rendered by a raster rendering engine of a computing system, such as raster rendering engine 918 of the computing system 900 of FIG. 9. In one example, a vis.js library may be used by the computing system 900 for real-time rendering for display via a web browser. The medium network graph 300 includes a plurality of vertices and a plurality of edges. In particular, a medium network graph may include a number of vertices that is greater than a first threshold (e.g., 1000 vertices) and less than a second, higher threshold (e.g., 5000 vertices).

For medium-sized network graphs, a raster-based rendering engine may be used to provide faster rendering relative to SVG-based rendering. Compared to SVG-based rendering, raster-based drawings may be rendered faster for larger network graphs because individual elements (e.g., vertices) are not tracked and managed during drawing time. Rather, raster-based drawings, such as rendered using vis.js canvas, track each pixel individually. As such, network graphs rendered via the raster-based rendering engine may support less user interaction relative to an SVG-based rendered network graph in which each vector (e.g., vertex, edge) can be selected. However, user interactions may be supported to a degree for a network graph rendered using the raster-based rendering engine. For example, the computing system 900 may be configured to define a plurality of pixel subsets or "hot spots" of the plurality of pixels of the rendered network graph 300. Each pixel subset may represent a different vertex of the plurality of vertices, a different edge of the plurality of edges, or groupings of multiple vertices or edges of the network graph 300. The computing system 900 may be further configured to receive user input associated with one or more of the pixel subsets and perform a display operation related to one or more vectors or edges associated with the one or more pixel subsets based on the user input.

In the illustrated example, user input (e.g., click, touch, hover) is received at a pixel subset or hot spot 302 that is associated with a vertex 304 in the rendered network graph 300, and a description 306 of the vertex 304 is displayed based on the user input being received at the hot spot 302. In another example, user input is received at a pixel subset or hot spot 308 associated with a subset of vertices of the network graph 300, and a description 312 of the subset of vertices 310 is displayed based on the user input being received at the hot spot 308. In still another example, user input is received at a pixel subset or hot spot 314 associated with an edge 316 of the network graph 300, and a description 318 of the edge 316 is displayed based on the user input being received at the hot spot 314.

A pixel subset or hot spot may include any suitable number of pixels of a rendered network graph. Moreover, a pixel subset or hot spot may be associated with any suitable element (e.g., vertex, edge) or group of elements of a network graph. Display of a network graph rendered with the raster rendering engine may be manipulated (e.g., an updated network graph may be rendered) in any suitable manner based on any suitable user input.

SVG and raster-based drawings can be used to draw network graphs that look very similar although the underlying technology is different. While drawing is faster using raster-based drawings, interactivity is not as robust as SVG. As such, raster-based drawings are well suited for medium-sized graphs that might bog down SVG. In an example implementation, raster-based technology is used for network graphs from 1001-5,000 vertices.

In some implementations, a two-stage or hybrid approach may be used to render medium network graphs, in which a graph layout is first computed using a layout algorithm (e.g., using Vis.js—the raster-based rendering engine), and then coordinates of the vertices and edges can be determined from the graph layout generated by the layout algorithm to construct an SVG-based rendered network graph that has a higher level of user interaction.

Figure 4:
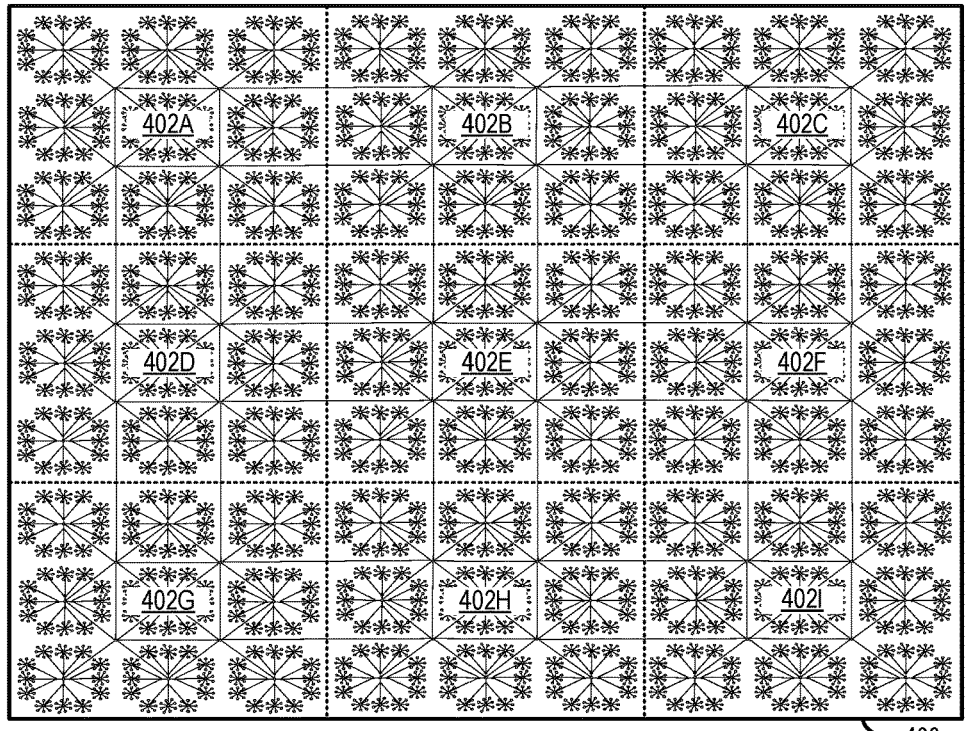
FIG. 4 shows a large network graph.

FIG. 4 shows an example large network graph 400 rendered by a remote tile rendering engine 920 of a remote server computing system 922 of FIG. 9. The large network graph 400 includes a plurality of vertices and a plurality of edges. In particular, a large network graph may include a greater number of vertices than the second threshold (e.g., 5000 vertices).

For large graph sizes, a tile-based image rendering system may be used to remotely generate the network graph 400 on one or more servers. In other words, multiple high-resolution images 402 (indicated by dotted lines) of the network graph 400 may be produced using the computing resources of the remote server(s). The remotely-rendered image tiles 402 may be generated offline prior to the computing system 900 accessing network data that defines the network graph 400. Further, the pre-rendered image tiles may be provided to the computer on which the visualizations are displayed, and the images tile 402 may be tiled together so that the viewer can zoom in and out on the network graph 400 while maintaining high fidelity.

Figure 5:
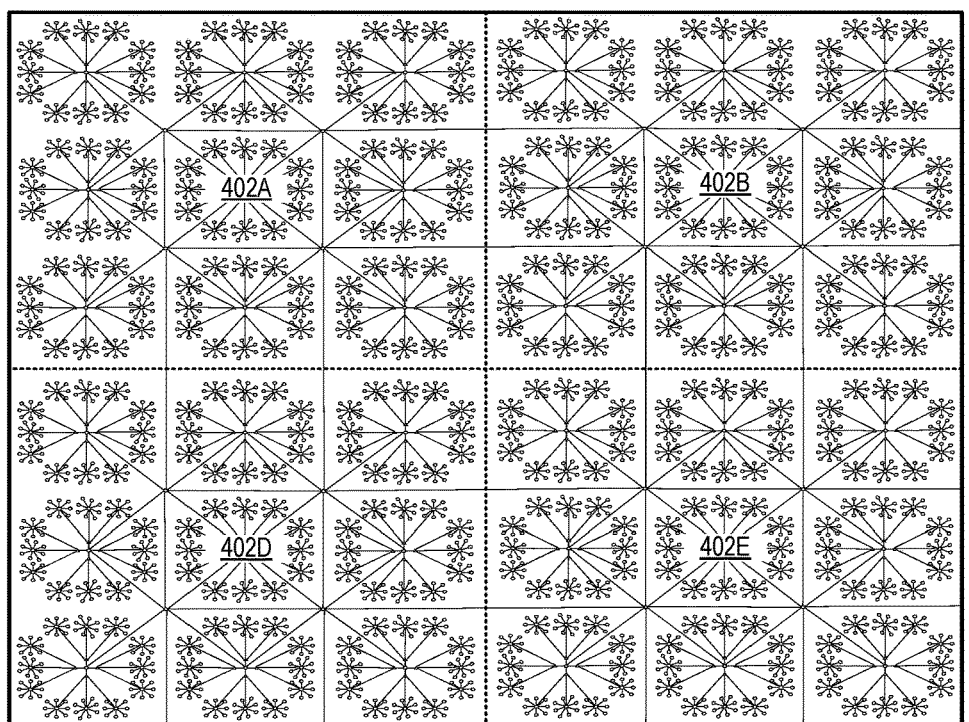
FIG. 5 shows a network graph having a zoomed-in view formed by a subset of tiles of the large network graph of FIG. 4.

In the example depicted in FIG. 4, the network graph 400 includes nine tiles 402 (e.g., 402A, 402B, 402C, 402D, 402E, 402F, 402G, 402H, 402I). The computing system 900 may be configured to request a subset of tiles of the network graph 400 based on user input (or another operation). For example, as shown in FIG. 5, the computing system 900 may receive four tiles 402 (e.g., 402A, 402B, 402D, 402E) of the network graph 400 from the remote server computing system 922, and display the four tiles of the network graph 400 based on the user input.

In one example, Microsoft® Automatic Graph Layout (MSAGL) may be used to generate pre-rendered tile images with Microsoft® Windows Presentation Foundation and C#, and the pre-rendered image tiles may be transmitted and viewed using Microsoft® Deep Zoom.

In some implementations, users may interact with the large network graph 400 in a manner similar to that of the medium network graph 300. In particular, pixel subsets or hot spots can be defined for different portions of the image tiles 402 so that the different portions of the different image tiles are responsive to user interactions (e.g., click or hover), thus providing some level of user interactivity. In an example implementation, remotely generated tiles may be used for network graphs larger than 5,000 vertices.

Any suitable layout algorithms may be used in the rendering approaches discussed herein. In some examples, layout algorithms may be configured to cluster related vertices, minimize edge lengths, avoid edge crossings, avoid edges passing too close to unconnected vertices, maintain an ordering of vertices, etc.

Figure 6:
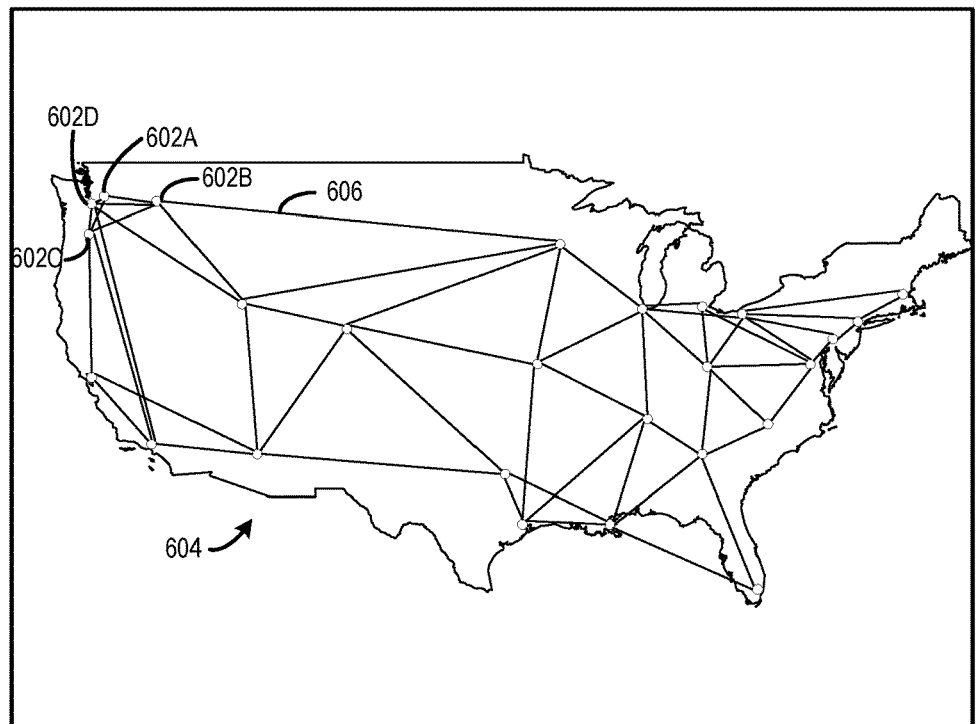
FIG. 6 show a network graph with vertices geographically locked to a map.
Figure 7:
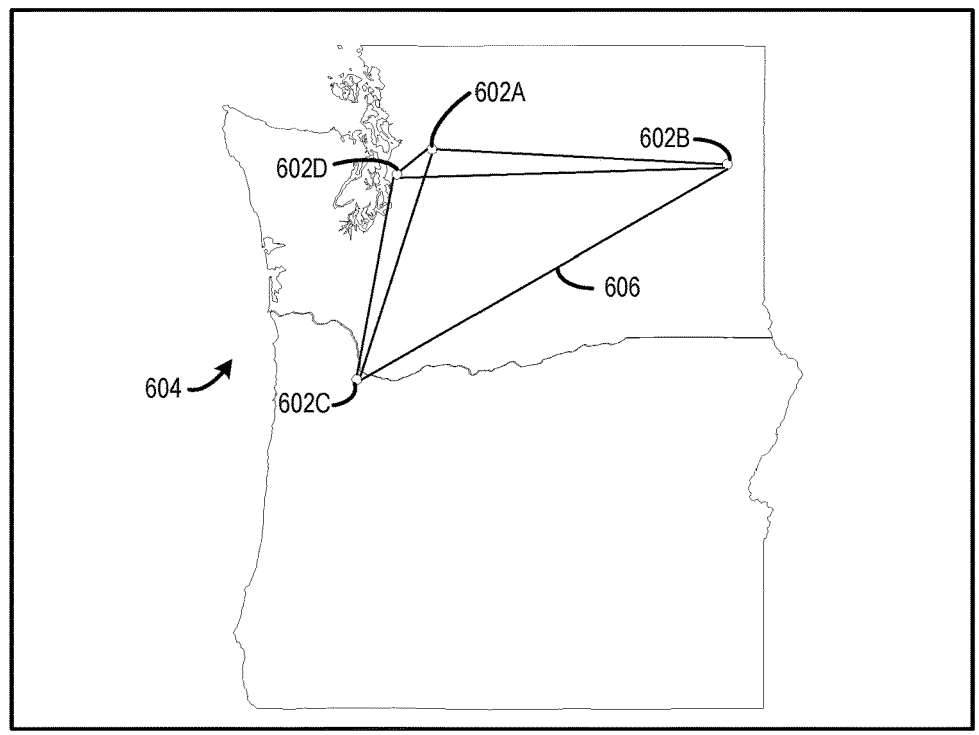
FIG. 7 shows a network graph having a zoomed-in perspective of the map relative to the network graph of FIG. 6.

In other implementations, the spatial position of a vertex may be geographically locked. For example, a network graph may be overlaid on a map, and the location of a vertex representing a branch location of a business may be geographically locked to that actual location of the branch on the map. FIGS. 6 and 7 show an example network graph 600 in which the vertices 602 are geographically locked to locations on a map 604. In FIG. 6, the network graph 600 is overlaid on a map 604 of the United States such that different vertices 602 (e.g., 602A, 602B, 602C, 602D) are locked to geographic location of different cities in the United States. The different vertices 602 are connected by a plurality of edge 606. In FIG. 7, the view of the map 604 is zoomed-in to view Washington state and Oregon state. In this example, although the view of the map 604 changes, the vertices 602 of the network graph 600 are locked to the same geographic locations of the cities in Washington state and Oregon state.

Figure 8:
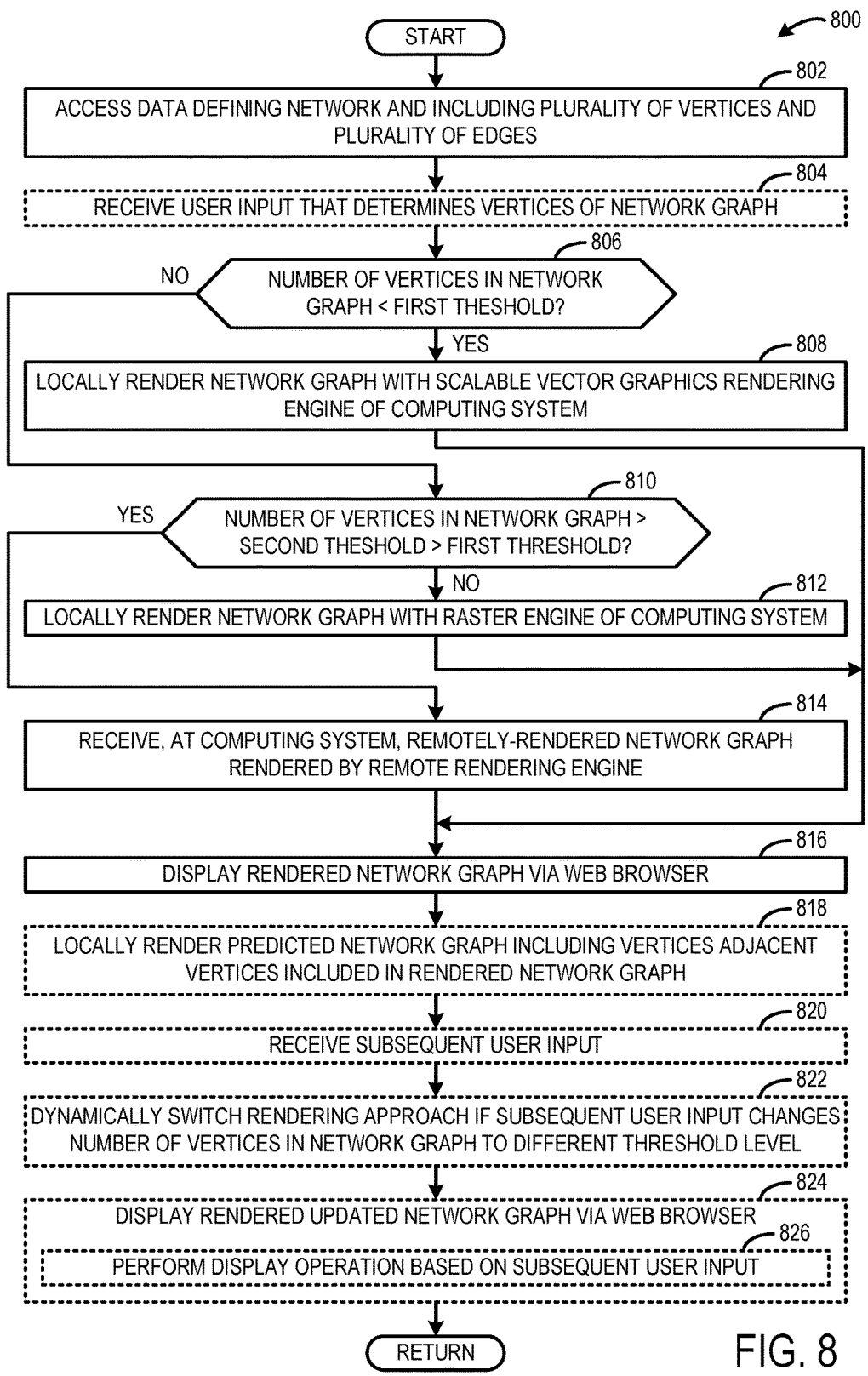
FIG. 8 shows an example method for displaying a network graph via a web browser.

FIG. 8 shows an example method 800 for displaying a network graph via a web browser. For example, the method 800 may be performed by the computing system 900 of FIG. 9. At 802, the method 800 includes accessing data defining a network including a plurality of vertices and edges. The network may be accessed based on any suitable operating condition of the computing system. In one example, the network may be accessed based on receiving user input. In another example, the network may be accessed by the computing system without user intervention.

In some implementations, the method 800 optionally may include receiving user input that determines the elements (e.g., vertices and edges) included in a network graph that is displayed via the web browser of the computing system. For example, such user input may include a navigation operation, such as a zoom operation or a scroll operation.

At 806, the method 800 includes determining whether the number of vertices of the network graph is below a first threshold. In one example, the first threshold is set to one thousand vertices. If the number of vertices included in the network graph is below the first threshold, then the method 800 moves to 808. Otherwise, if the number of vertices included in the network graph is not below the first threshold, then the method 800 moves to 810.

At 808, the method 800 includes locally rendering the network graph with a scalable vector graphics rendering engine of the computing system. Once the network graph is rendered with the scalable vector graphics rendering engine, the method 800 moves to 816.

At 810, the method 800 includes determining whether the number of vertices of the network graph is between the first threshold and a second, higher, threshold. If the number of vertices included in the network graph is between the first threshold and the second threshold, then the method moves to 812. Otherwise, if the number of vertices included in the network graph is greater than the second threshold, then the method moves to 814. In one example, the second threshold is set to five thousand vertices.

At 812, the method 800 includes locally rendering the network graph with a raster rendering engine of the computing system. Once the network graph is rendered with the raster rendering engine, the method 800 moves to 816. At 814, the method 800 includes receiving, at the computing system, a remotely-rendered network graph rendered by a remote rendering engine. Once the remotely-rendered network graph is received, the method 800 moves to 816. At 816, the method 800 includes displaying the rendered network graph via a web browser of the computing system.

In some implementations, at 818, the method 800 optionally may include locally rendering a predicted network graph including vertices adjacent the vertices included in the rendered network graph that is currently displayed via the web browser. The predicted network graph may be pre-rendered such that it is ready to be displayed without delay. The predicted network graph may include any suitable number of vertices. In some examples, multiple predicted network graphs may be pre-rendered. For example, predicted network graphs corresponding to each direction of translation (e.g., up, down, left, right) from the currently displayed rendered network graph may be pre-rendered in order to predict different user interactions with the network graph.

In some implementations, at 820, the method 800 optionally may include receiving subsequent user input. The subsequent user input may include any suitable user interaction that triggers re-rendering of the network graph to generate a rendered updated network graph. For example, the user input may include any suitable navigation operation (e.g., zoom, scroll).

In some implementations, at 822, the method 800 optionally may include dynamically switching to a different rendering engine/approach to render the updated network graph based on the number of vertices in the network graph changing to a different threshold level based on the subsequent user input. In one example, the currently displayed network graph was rendered using the raster rendering engine based on the network graph including a number of vertices between the first and second threshold. The subsequent user input is a zoom-in operation that causes the number of vertices included in the updated network graph to drop below the first threshold. Accordingly, the updated network graph is rendered using the SVG rendering engine instead of the raster rendering engine. In another example where the currently displayed network graph was rendered using the SVG rendering engine, a zoom-out operation may result in a dynamic switch from using the SVG rendering engine to rendering the updated network graph using the raster rendering engine or requesting tiled images from the remote computing device depending on how many vertices are included in the updated network graph.

In some implementations, at 824, the method 800 optionally may include displaying the rendered updated network graph via the web browser of the computing system. In some examples, the rendered updated network graph may include the rendered predicted network graph depending on whether the subsequent user input caused the predicted network graph to be included in the updated network graph.

In some implementations, at 826, the method 800 optionally may include performing a display operation on the rendered network graph based on the subsequent user input. In one example, a display operation may include displaying additional information about one or more selected vertices or edges of the network graph. In examples where the network graph is rendered via the SVG rendering engine, the display operation may be based on user input associated with a particular vector of the rendered network graph. In examples where the network graph is rendered with the raster rendering engine, the display operation may be based on user input associated with a particular pixel subset or hot spot of the rendered network graph.

The above-described display methods, rendering engines, and visualization approaches are not-limiting. Furthermore, the threshold vertex counts for switching between different approaches are not-limiting. In general, rendering operations may dynamically switch between two or more different rendering approaches based on virtually any criteria, including but not limited to, any particular vertex count threshold. In some implementations, a locally-executed, scalable vector graphics approach may be used below a first vertex threshold, a locally-executed raster approach may be used between the first vertex threshold and a second, higher, vertex threshold, and a remotely-created drawing may be used above the second threshold. In some implementations, the thresholds may be based on other elements of the network graph beyond just vertices. For example, the thresholds may be based on a total number of vertices and edges in a network graph.

In some implementations, when displaying a small, medium, or large network graph, a network graphing system may predict one or more views that an end-user is most likely to request (e.g., via pan, zoom, or graph switch). A predicted view may be pre-rendered and made ready should the user request the predicted view. Such pre-rendering may be performed locally or remotely.

In some implementations, the network graphing approaches described herein may be tied to a hardware network graphing system including one or more computing systems. In particular, such network graphing approaches may be implemented as a browser-based drawing component, such as an application, a plug-in, a module, a service, or a library. In general, the graphing approaches described herein may be implemented via any suitable browser technology.

FIG. 9 schematically shows a non-limiting implementation of a computing system 900 configured to enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 optionally may include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a network graphing task, implement a data type, transform the state of one or more components, achieve a technical effect, or otherwise arrive at a desired result.

The logic machine 902 may include one or more processors configured to execute software instructions. Additionally or alternatively, the logic machine 902 may include one or more hardware or firmware logic machines configured to execute hardware or firmware instructions. Processors of the logic machine 902 may be single-core or multi-core, and the instructions executed thereon may be configured for sequential, parallel, and/or distributed processing. Individual components of the logic machine 902 optionally may be distributed among two or more separate devices, which may be remotely located and/or configured for coordinated processing. Aspects of the logic machine 902 may be virtualized and executed by remotely accessible, networked computing devices configured in a cloud-computing configuration.

Storage machine 904 includes one or more physical devices configured to hold instructions executable by the logic machine 902 to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

For example, FIG. 9 shows logic machine 902 and storage machine 904 cooperating to instantiate an engine selector 912. Engine selector 912 may be a browser-based software component that determines the size of a network graph 914 prior to rendering the network graph 914 for display in the web browser via display subsystem 906. Based on selection criteria, the engine selector 912 may select a rendering engine from a plurality of different rendering engines to render the network graph 914. In the illustrated example, engine selector 912 may be configured to select between an SVG rendering engine 916 and a raster rendering engine 918. These rendering engines are local rendering engines that are at least partially executed by the computing system 900. Furthermore, engine selector 912 may utilize remotely-located rendering engines, such as a tile rendering engine 920 at least partially executed by a remote server computing system 922. For example, the engine selector 912 may select a rendering engine to render a particular network graph based on a size of the network graph, as described above.

When included, display subsystem 906 may be used to present a visual representation of data held by storage machine 904. This visual representation may take the form of a network graph. As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices, such as remoter server computing system 922. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 910 may allow computing system 900 to send and/or receive messages to and/or from other devices via a network such as the Internet.

In an example, a method of displaying a network graph with a computing system, comprises accessing data defining a network and including a plurality of vertices and a plurality of edges, locally rendering a network graph with a scalable vector graphics rendering engine of the computing system if a number of vertices included in the network graph is below a first threshold, locally rendering a network graph with a raster rendering engine of the computing system if a number of vertices included in the network graph is between the first threshold and a second, higher, threshold, receiving, at the computing system, a remotely-rendered network graph rendered by a remote rendering engine if a number of vertices included in the network graph is above the second threshold, and displaying the rendered network graph via a web browser of the computing system. In this example and/or other examples, the method may further comprise receiving user input, and wherein the number of vertices included in the network graph is determined based on the user input. In this example and/or other examples, the user input may include a zoom operation that determines the number of vertices included in the network graph. In this example and/or other examples, the user input may include a scroll operation that determines the number of vertices included in the network graph. In this example and/or other examples, the method may further comprise receiving subsequent user input that causes the number of vertices included in the network graph to change to a different threshold level, dynamically switching to a different rendering approach to render an updated network graph based on the number of vertices changing to the different threshold level, and displaying the rendered updated network graph via the web browser of the computing system. In this example and/or other examples, the method may further comprise locally rendering a predicted network graph including vertices adjacent the vertices included in the rendered network graph, and displaying the rendered predicted network graph via the web browser of the computing system based on subsequent user input. In this example and/or other examples, the network graph locally rendered with the scalable vector graphics rendering engine includes a plurality of vectors representing vertices and edges included in the network graph, and the method may further comprise receiving subsequent user input associated with one or more vectors of the plurality of vectors, and performing a display operation related to vertices or edges represented by the one or more vectors based on the subsequent user input. In this example and/or other examples, the network graph locally rendered with the raster rendering engine includes a plurality of pixels, and the method may further comprise defining a plurality of pixel subsets of the plurality of pixels, each pixel subset associated with a different vertex of the plurality of vertices or a different edge of the plurality of edges, receiving subsequent user input associated with one or more pixel subsets, and performing a display operation related to one or more vectors or edges associated with the one or more pixel subsets based on the subsequent user input. In this example and/or other examples, the data defining the network may include a geographic location associated with each vertex of the plurality of vertices, and the rendered network graph may include vertices overlaid on a map and locked to the associated geographic locations on the map. In this example and/or other examples, the remotely-rendered network graph may include a plurality of image tiles, and the plurality of image tiles may be remotely rendered prior to the data defining the network being accessed by the computing system. In this example and/or other examples, the first threshold may be at least one thousand vertices. In this example and/or other examples, the second threshold may be at least five thousand vertices.

In an example, a computing system comprises a logic machine, a storage machine holding instructions executable by the logic machine to access data defining a network and including a plurality of vertices and a plurality of edges, locally render a network graph with a scalable vector graphics rendering engine of the computing system if a number of vertices included in the network graph is below a first threshold, locally render a network graph with a raster rendering engine of the computing system if a number of vertices included in the network graph is between the first threshold and a second, higher, threshold, receive a remotely-rendered network graph rendered by a remote rendering engine if a number of vertices included in the network graph is above the second threshold, and display the rendered network graph via a web browser of the computing system. In this example and/or other examples, the storage machine may further hold instructions executable by the logic machine to receive user input, and wherein the number of vertices included in the network graph is determined based on the user input. In this example and/or other examples, the storage machine may further hold instructions executable by the logic machine to receive subsequent user input that causes the number of vertices included in the network graph to change to a different threshold level, dynamically switch to a different rendering approach to render an updated network graph based on the number of vertices changing to the different threshold level; and display the rendered updated network graph via the web browser of the computing system. In this example and/or other examples, the storage machine may further hold instructions executable by the logic machine to locally render a predicted network graph including vertices adjacent the vertices included in the rendered network graph, and display the rendered predicted network graph via the web browser of the computing system based on subsequent user input. In this example and/or other examples, the network graph locally rendered with the scalable vector graphics rendering engine includes a plurality of vectors representing vertices and edges included in the network graph, and the storage machine may further hold instructions executable by the logic machine to receive subsequent user input associated with one or more vectors of the plurality of vectors, and perform a display operation related to vertices or edges represented by the one or more vectors based on the subsequent user input. In this example and/or other examples, the network graph locally rendered with the raster rendering engine includes a plurality of pixels, and the storage machine may further hold instructions executable by the logic machine to define a plurality of pixel subsets of the plurality of pixels, each pixel subset associated with a different vertex of the plurality of vertices or a different edge of the plurality of edges, receive subsequent user input associated with one or more pixel subsets, and perform a display operation related to one or more vectors or edges associated with the one or more pixel subsets based on the subsequent user input.

In an example, a method of displaying a network graph with a computing system comprises accessing data defining a network and including a plurality of elements, locally rendering a network graph with a scalable vector graphics rendering engine of the computing system if a number of elements included in the network graph is below a first threshold, locally rendering a network graph with a raster rendering engine of the computing system if a number of elements included in the network graph is between the first threshold and a second, higher, threshold, receiving, at the computing system, a remotely-rendered network graph rendered by a remote rendering engine if a number of elements included in the network graph is above the second threshold, and displaying the rendered network graph via a web browser of the computing system. In this example and/or other examples, the plurality of elements may include vertices and edges.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of displaying a network graph with a computing system, comprising:
   accessing data defining a network and including a plurality of vertices and a plurality of edges;
   locally rendering a network graph with a scalable vector graphics rendering engine of the computing system and displaying the network graph rendered by the scalable vector graphics rendering engine via a web browser of the computing system if a number of vertices included in the network graph is below a first threshold;
   locally rendering a network graph with a raster rendering engine of the computing system and displaying the network graph rendered by the raster rendering engine via the web browser if a number of vertices included in the network graph is between the first threshold and a second, higher, threshold; and
   receiving, at the computing system, a remotely-rendered network graph rendered by a remote rendering engine and displaying the remotely-rendered network graph via the web browser if a number of vertices included in the network graph is above the second threshold.

2. The method of claim 1, further comprising:
   receiving user input, and wherein the number of vertices included in the network graph is determined based on the user input.

3. The method of claim 2, wherein the user input includes a zoom operation that determines the number of vertices included in the network graph.

4. The method of claim 2, wherein the user input includes a scroll operation that determines the number of vertices included in the network graph.

5. The method of claim 2, further comprising:
receiving subsequent user input that causes the number of vertices included in the network graph to change to a different threshold level;
dynamically switching to a different rendering approach to render an updated network graph based on the number of vertices changing to the different threshold level; and
displaying the rendered updated network graph via the web browser of the computing system.

6. The method of claim 2, further comprising:
locally rendering a predicted network graph including vertices adjacent the vertices included in the rendered network graph; and
displaying the rendered predicted network graph via the web browser of the computing system based on subsequent user input.

7. The method of claim 1, wherein the network graph locally rendered with the scalable vector graphics rendering engine includes a plurality of vectors representing vertices and edges included in the network graph, and the method further comprises:
receiving subsequent user input associated with one or more vectors of the plurality of vectors; and
performing a display operation related to vertices or edges represented by the one or more vectors based on the subsequent user input.

8. The method of claim 1, wherein the network graph locally rendered with the raster rendering engine includes a plurality of pixels, and the method further comprises:
defining a plurality of pixel subsets of the plurality of pixels, each pixel subset associated with a different vertex of the plurality of vertices or a different edge of the plurality of edges;
receiving subsequent user input associated with one or more pixel subsets; and
performing a display operation related to one or more vectors or edges associated with the one or more pixel subsets based on the subsequent user input.

9. The method of claim 1, wherein the data defining the network includes a geographic location associated with each vertex of the plurality of vertices, and wherein the rendered network graph includes vertices overlaid on a map and locked to the associated geographic locations on the map.

10. The method of claim 1, wherein the remotely-rendered network graph includes a plurality of image tiles, and wherein the plurality of image tiles is remotely rendered prior to the data defining the network being accessed by the computing system.

11. The method of claim 1, wherein the first threshold is at least one thousand vertices.

12. The method of claim 1, wherein the second threshold is at least five thousand vertices.

13. A computing system comprising:
a logic machine;
a storage machine holding instructions executable by the logic machine to:
access data defining a network and including a plurality of vertices and a plurality of edges;
locally render a network graph with a scalable vector graphics rendering engine of the computing system and display the network graph rendered by the scalable vector graphics rendering engine via a web browser of the computing system if a number of vertices included in the network graph is below a first threshold;
locally render a network graph with a raster rendering engine of the computing system and display the network graph rendered by the raster rendering engine via the web browser if a number of vertices included in the network graph is between the first threshold and a second, higher, threshold; and
receive a remotely-rendered network graph rendered by a remote rendering engine and display the remotely-rendered network graph via the web browser if a number of vertices included in the network graph is above the second threshold.

14. The computing system of claim 13, wherein the storage machine further holds instructions executable by the logic machine to:
receive user input, and wherein the number of vertices included in the network graph is determined based on the user input.

15. The computing system of claim 14, wherein the storage machine further holds instructions executable by the logic machine to:
receive subsequent user input that causes the number of vertices included in the network graph to change to a different threshold level;
dynamically switch to a different rendering approach to render an updated network graph based on the number of vertices changing to the different threshold level; and
display the rendered updated network graph via the web browser of the computing system.

16. The computing system of claim 14, wherein the storage machine further holds instructions executable by the logic machine to:
locally render a predicted network graph including vertices adjacent the vertices included in the rendered network graph; and
display the rendered predicted network graph via the web browser of the computing system based on subsequent user input.

17. The computing system of claim 13, wherein the network graph locally rendered with the scalable vector graphics rendering engine includes a plurality of vectors representing vertices and edges included in the network graph, and wherein the storage machine further holds instructions executable by the logic machine to:
receive subsequent user input associated with one or more vectors of the plurality of vectors; and
perform a display operation related to vertices or edges represented by the one or more vectors based on the subsequent user input.

18. The computing system of claim 13, wherein the network graph locally rendered with the raster rendering engine includes a plurality of pixels, and wherein the storage machine further holds instructions executable by the logic machine to:
define a plurality of pixel subsets of the plurality of pixels, each pixel subset associated with a different vertex of the plurality of vertices or a different edge of the plurality of edges;
receive subsequent user input associated with one or more pixel subsets; and
perform a display operation related to one or more vectors or edges associated with the one or more pixel subsets based on the subsequent user input.

19. A method of displaying a network graph with a computing system, comprising:

accessing data defining a network and including a plurality of elements;

locally rendering a network graph with a scalable vector graphics rendering engine of the computing system and displaying the network graph rendered by the scalable vector graphics rendering engine via a web browser of the computing system if a number of elements included in the network graph is below a first threshold;

locally rendering a network graph with a raster rendering engine of the computing system and displaying the network graph rendered by the raster rendering engine via the web browser if a number of elements included in the network graph is between the first threshold and a second, higher, threshold; and receiving, at the computing system, a remotely-rendered network graph rendered by a remote rendering engine and displaying the remotely-rendered network graph via the web browser if a number of elements included in the network graph is above the second threshold.

20. The method of claim 19, wherein the plurality of elements includes vertices and edges.

\* \* \* \* \*